US009396046B2

(12) United States Patent
Laredo et al.

(10) Patent No.: US 9,396,046 B2
(45) Date of Patent: Jul. 19, 2016

(54) GRAPH BASED DATA MODEL FOR API ECOSYSTEM INSIGHTS

(71) Applicant: International Business Machines Corporation, Armonk, NY (US)

(72) Inventors: Jim A. Laredo, Katonah, NY (US); Vinod Muthusamy, Toronto (CA); Aleksander Slominski, Riverdale, NY (US); Biplav Srivastava, Noida (IN); Maja Vukovic, New York, NY (US); John E. Wittern, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 14/180,686

(22) Filed: Feb. 14, 2014

(65) Prior Publication Data
US 2015/0121401 A1 Apr. 30, 2015

Related U.S. Application Data
(60) Provisional application No. 61/897,866, filed on Oct. 31, 2013.

(51) Int. Cl.
*G06F 9/54* (2006.01)
(52) U.S. Cl.
CPC ........................................ *G06F 9/54* (2013.01)
(58) Field of Classification Search
CPC ........................................................ G06F 9/54
See application file for complete search history.

(56) References Cited

U.S. PATENT DOCUMENTS

| 5,542,078 A | 7/1996 | Martel et al. |
| 7,058,655 B2 | 6/2006 | Goldberg et al. |

(Continued)

FOREIGN PATENT DOCUMENTS

| EP | 0948225 B1 | 7/2008 |
| WO | 2008111051 A2 | 9/2008 |

(Continued)

OTHER PUBLICATIONS

Michael Weiss, Modeling the mashup ecosystem: structure and growth, Jan. 2010, pp. 1-11.*

(Continued)

*Primary Examiner* — Syed Roni
(74) *Attorney, Agent, or Firm* — Yee & Associates, P.C.; Lou Percello

(57) ABSTRACT

An embodiment of the invention comprising a method captures information for a data structure, the information pertaining to Web application programming interfaces APIs and Web application programming interface API users. The method includes identifying a first set of relationships, wherein an identified relationship can be at least a relationship between a Web API and a Web API user, between different Web API users, or between different Web APIs. The method further includes furnishing the first set of relationships to the data structure as first captured information, and using the first captured information to perform a specified analysis operation. Prior to or during performance of the specified analysis operation, second information is added to the data structure wherein the added second information includes at least one of a user, a Web API, or a relationship that is not included in the first captured information, and the added second information does not affect performance of the specified analysis operation.

18 Claims, 7 Drawing Sheets

(56) References Cited

U.S. PATENT DOCUMENTS

| | | | |
|---|---|---|---|
| 8,074,160 | B2 | 12/2011 | Fry et al. |
| 2003/0135503 | A1 | 7/2003 | Goldberg et al. |
| 2007/0104100 | A1 | 5/2007 | Davey et al. |
| 2008/0221867 | A1 | 9/2008 | Schreiber |
| 2009/0006152 | A1 | 1/2009 | Timmerman et al. |
| 2009/0235285 | A1* | 9/2009 | Kim et al. ............ 719/328 |
| 2012/0054065 | A1 | 3/2012 | Sung et al. |
| 2014/0090020 | A1 | 3/2014 | Meiners et al. |
| 2014/0114805 | A1 | 4/2014 | Akolkar et al. |
| 2014/0180868 | A1 | 6/2014 | Kanigsberg et al. |
| 2014/0379885 | A1 | 12/2014 | Krishnamurthy et al. |
| 2015/0363492 | A1 | 12/2015 | Laredo et al. |
| 2015/0363493 | A1 | 12/2015 | Laredo et al. |

FOREIGN PATENT DOCUMENTS

| | | |
|---|---|---|
| WO | 2008111051 A2 | 2/2010 |
| WO | 2013056104 A1 | 10/2012 |
| WO | 2013096506 A1 | 12/2012 |
| WO | 2013056104 A1 | 4/2013 |
| WO | 2013096506 A1 | 6/2013 |

OTHER PUBLICATIONS

Laredo et al., "Use of Collected Data for Web API Ecosystem Analytics," U.S. Appl. No. 14/302,517, filed Jun. 12, 2014, 47 pages.

Laredo et al., "Continuous Collection of Web API Ecosystem Data," U.S. Appl. No. 14/302,756, filed Jun. 12, 2014, 34 pages.

Moore et al., "WebSphere Business Integration Server Foundation Using the Programming API and the Common Event Infrastructure," IBM Redbooks, Apr. 2005, 240 pages.

Wittern et al., "A Graph-based Data Model for API Ecosystem Insights," Proceedings of the 21 IEEE International Conference on Web Services (ICWS), Jun.-Jul. 2014, 8 pages.

Cuomo et al., "Supporting Software Application Developers to Iteratively Refine Requirements for Web Application Programing Interfaces," U.S. Appl. No. 14/623,156, filed Feb. 16, 2015, 34 pages.

Bianchini et al., "A Multi-perspective Framework for Web API Search in Enterprise Mashup Design," Advanced Information Systems Engineering, Jan. 2013, pp. 353-368.

Akolkar et al., "Automatic Modification of Requirements Based on Consumption and Market Changes," U.S. Appl. No. 14/563,104, filed Dec. 8, 2014, 36 pages.

"Cluster analysis," Wikipedia Foundation, Inc., dated Jan. 16, 2014, 17 pages. Accessed Jan. 18, 2014, en.wikipedia.org/wiki/Cluster_analysis.

"Graph Based Recommendation Systems at eBay," Planet Cassandra, Mar. 25, 2013, 18 pages. Accessed Jan. 15, 2014, http://www.slideshare.net/planetcassandra/e-bay-nyc.

"Web API," Wikipedia Foundation, Inc., dated Dec. 7, 2013, 2 pages. Accessed Jan. 14, 2014, en.wikipedia.org/wiki/Web_API.

Belhajjame et al., "PROV-O: The PROV Ontology," W3C, Apr. 30, 2013, 71 pages. Accessed Feb. 10, 2014, http://www.w3.org/TR/prov-o/.

Cohen et al, "A Comparison of String Distance Metrics for Name-Matching Tasks," Proceedings of the Eighteenth International Joint Conference on Artificial Intelligence (IJCAI-03) Workshop on Information Integration, Aug. 2003, pp. 73-78.

Dojchinowski et al., "Personalised Graph-Based Selection of Web APIs," In the Semantic Web—ISWC, Nov. 2012, pp. 34-48.

Foggia et al, "A Graph-Based Clustering Method and Its Applications," Advances in Brain, Vision, and Artificial Intelligence, Jan. 2007, pp. 277-287.

Gantner et al., "RPG: APIs," IBM Redbooks, Dec. 2007, pp. 1-78.

Georgescu, "WSRP-Enabled Distributed Data Mining Services Deliverable over a Knowledge-Driven Portal," Proceedings of the 7th WSEAS International Conference on Applied Computer & Applied Computational Science, Apr. 2008, pp. 150-155.

Huang et al., "Service Recommendation in an Evolving Ecosystem —A Link Prediction Approach," IEEE 20th International Conference on Web Services (ICWS), Jun.-Jul. 2013, pp. 507-514.

Kawaji Et El., "Graph-based clustering for finding distant relationships in a large set of protein sequences," Bioinformatics, vol. 20, No. 2, Jan. 2004, pp. 243-252.

Lee et al., "A Generic Graph-based Multidimensional Recommendation Framework and Its Implementations," Proceedings of the 21st International Conference Companion on world Wide Web, Apr. 2012, pp. 161-165.

Moore et al., "WebSphere Business Integration Server Foundation Using the Programming API and the Common Event Architecture," IBM Redbooks, Apr. 2005, 240 pages.

Popov, "Release Update: The new Apiphany Analytics System is here!," Apiphany, Apr. 9, 2013, 4 pages. Accessed Feb. 10, 2014, http://apiphany.com/blog/release-update-the-new-apiphany-analytics-system-is-here.

Rodriguez, "A Graph-Based Movie Recommender Engine," Sep. 22, 2011, 12 pages. Accessed Jan. 15, 2014, http://markorodriguez.com/2011/09/221a-graph-based-movie-recommender-engine/.

Schaeffer, "Graph clustering," Computer Science Review, vol. 1, No. 1, Aug. 2007, pp. 27-64. geza.kzoo.edu/~erdi/patent/Schaeffer07.

Torres et al., "Improving Web API Discovery by Leveraging Social Information," IEEE International Conference on Web Services (ICWS), Jul. 2011, pp. 744-745.

Wang et al., "Graph-Based Recommendation on Social Networks," IEEE 12th International Asia-Pacific Web Conference (APWEB), Apr. 2010, pp. 116-122.

Xu et al., "A Model-based Approach to Attributed Graph Clustering," Proceedings of the 2012 ACM SIGMOD International Conference on Management of Data. ACM, May 2012, 12 pages.

Zhong et al., "MAPO: Mining and Recommending API Usage Patterns," Genoa Proceedings of the 23rd European Conference on ECOOP, Jul. 2009, 25 pages.

Zhou et al., "Graph Clustering Based on Structural/Attribute Similarities," Proceedings of the VLDB Endowment, Aug. 2009, 12 pages.

Cuomo et al., "Supporting Software Application Developers to Iteratively Refine requirements for Web Application Programming Interfaces," U.S. Appl. No. 14/743,171, filed Jun. 18, 2015, 31 pages.

Office Action, dated Mar. 2, 2016, regarding U.S. Appl. No. 14/302,517, 31 pages.

Lim et al., "App Epidemics: Modelling the Effects of Publicity in a Mobile App Ecosystem," Artificial Life, vol. 13, Jul. 2012, pp. 202-209.

Nguyen et al., "A Graph-based Approach to API Usage Adaptation," Proceedings of the ACM International Conference on Object Oriented Programming Systems Languages and Applications (OOPSLA '10), Oct. 2010, pp. 302-321.

Notice of Allowance, dated Apr. 20, 2016, regarding U.S. Appl. No. 14/302,517, 9 pages.

* cited by examiner

FIG. 3

| | Role | Insight | Paths to Insight | Result |
|---|---|---|---|---|
| 302 | Consumer $i$ | Which APIs are my contacts using? | $U_i \xrightarrow{contact} U_{1...n}$ <br> $U_{1...n} \xrightarrow{invocation} API_{1...m}$ | $API_{1...m}$ |
| 304 | Consumer $i$ | Which APIs meet my requirements? | $U_i \xrightarrow{requirement} C_{1...n}$ <br> $API_{1...m} \xrightarrow{feature} C_{1...n}$ | $API_{1...m}$ |
| 306 | Provider $j$ | Which characteristics are required that I currently do not offer? | $U_j \xrightarrow{provides} API/App_{1...n}$ <br> $API/App_{1...n} \xrightarrow{feature} C_{1...m}$ <br> $U_{1...k} \xrightarrow{requirement} C_{1...l}$ | $C_{1...l}$ <br> $C_{1...m}$ |
| 308 | Provider $j$ | Who provides APIs/Apps with similar characteristics? | $U_j \xrightarrow{provision} API/App_{1...n}$ <br> $API/App_{1...n} \xrightarrow{feature} C_{1...m}$ <br> $API/App_{1...k} \xrightarrow{feature} C_{1...m}$ <br> $U_{1...l} \xrightarrow{provision} API/App_{1...k}$ | $U_{1...l}$ |
| 310 | Ecosystem | Which characteristics are common to successful APIs/Apps? | $U \xrightarrow{invocation > x} API/App_{1...n}$ <br> $API/App_{1...n} \xrightarrow{provision} C_{1...m}$ | $C_{1...m}$ |
| 312 | Ecosystem | Which often required characteristics are not provided by unsuccessful APIs? | $U \xrightarrow{requirement > x} C_{1...n}$ <br> $U \xrightarrow{invocation < y} API/App_{1...m}$ <br> $API/App_{1...m} \xrightarrow{provision} C_{1...k}$ | $C_{1...n}$ <br> $C_{1...k}$ |

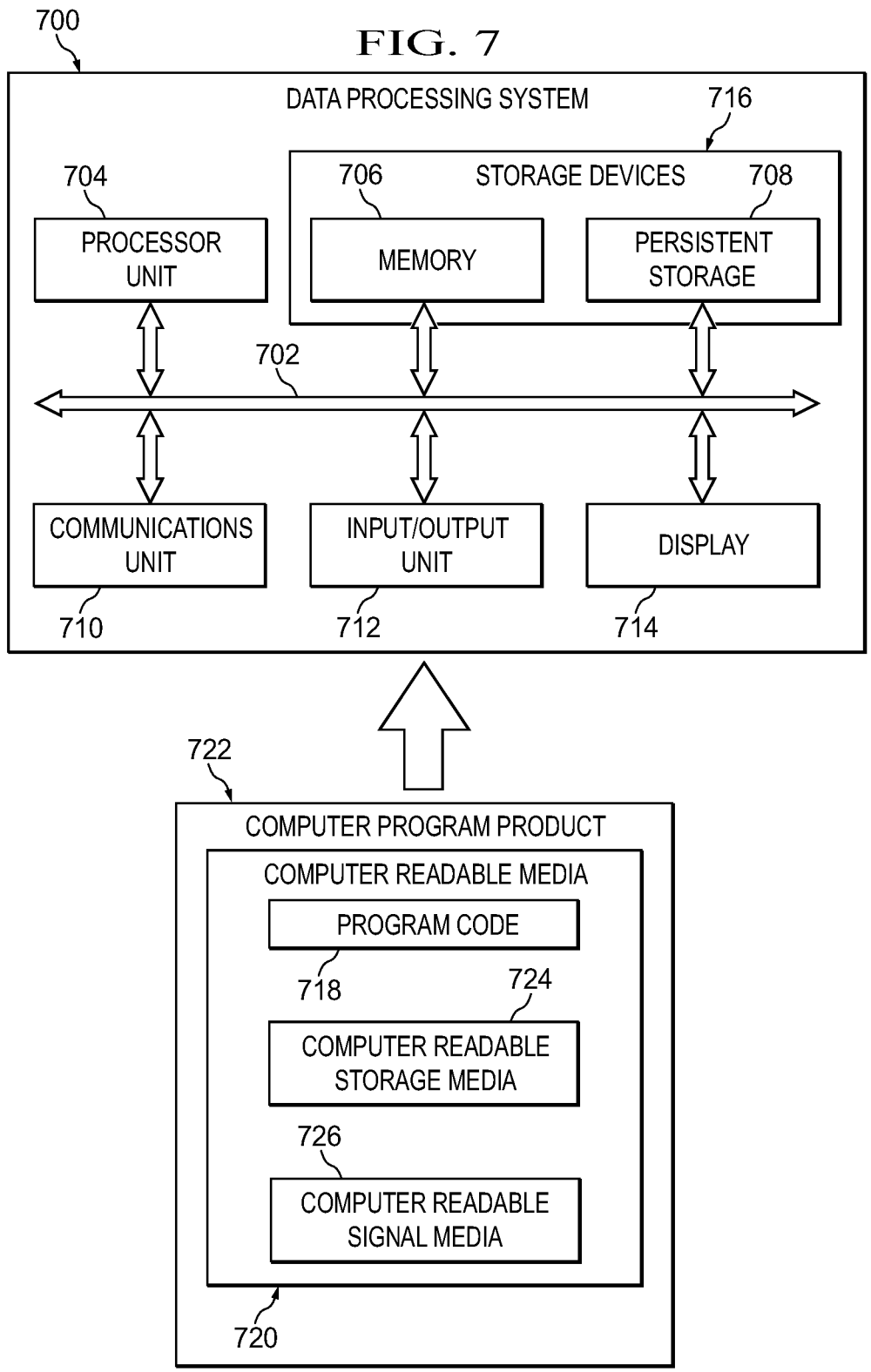

GRAPH BASED DATA MODEL FOR API ECOSYSTEM INSIGHTS

This application claims the benefit of U.S. Provisional Application Ser. No. 61/897,866, filed on Oct. 31, 2013, and entitled "A Graph-based Data Model for API Ecosystem Insights".

BACKGROUND

1. Field

The invention disclosed and claimed herein generally pertains to an extensible, graph based data model or data structure that is used to capture the entities in an application programming interface (API) ecosystem and their relations. More particularly, embodiments of the invention pertain to Web APIs and Web API ecosystems, as described hereinafter.

2. Description of the Related Art

APIs are increasingly important for companies to enable partners and consumers to access their services and resources. API ecosystems deal with related challenges like publication, promotion and provision of APIs by providers and identification, selection and consumption of APIs by consumers. To address these challenges, match consumers with relevant APIs, and support API providers and thus ultimately the ecosystem to evolve, API ecosystems rely on information about APIs, their usage and characteristics, and the social environment around them.

Today more and more business functions are delivered as API-centric services, enabling businesses and developers to co-create customer value with speed and scale. Mobile, analytics, social and cloud technologies fuel the hyper-growth of API-centric businesses as-a-service economies. This new economy, also known as the API economy, is in full swing as can be attested by many trade publications, and by certain web sites that track new APIs and their use. At a recent time, one web site had just crossed 10,000 APIs, from just over 100 APIs back in 2005, 5000 APIs in early 2012 and 9000 APIs just in April of 2013.

Born-on-the-web companies are co-creating value through APIs, and enterprises are taking notice. Certain enterprises that first open consumer-driven APIs are exposing core capabilities from their backend enterprise systems. Some insurance companies are developing relationships with pharmacies to facilitate prescription refills. A certain credit card company is using social media to change the way they reach the customer and deliver promotions at the right time and place.

SUMMARY

It is believed that the above trends will continue and will proliferate across industries and horizontal functions. New environments where enterprises and their partners grow their ecosystems around their APIs, facilitating their consumption and creating new derived business functions and applications, will have to deal with the content growth. It will be important to capture the knowledge around all aspects of an API as seen by those consuming them, so that lessons learned may be easily shared with others. Social aspects are already expected including ratings and various mediums to discuss pertinent issues. API details and relationships with others will be captured over time, for example, parameter requirements such as optional vs. mandatory, parameter formatting details, or sequence of API invocations and how they may change as the API evolves through time. This information may be retrieved in the form of documentation or in a more structured way so that tooling can easily process it and facilitate the use and composition of APIs. Collecting the collective experience can also yield recommendations of what else to use when a common scenario is identified, or how to map outputs from one API to inputs of the next, and a number of analytics opportunities may arise from the use of each API.

In an API ecosystem, like a marketplace or developer site, three roles are seen benefiting from these relationships. These are the API provider, the ecosystem provider, and the API consumer. For the API provider it creates a feedback loop on the usage of its APIs. For the API consumer, it accelerates further their time to value, faster discovery, and faster integration with other APIs. For the ecosystem provider, in addition to facilitating a vibrant ecosystem, it gives them insight not just on usage but on gaps that need to be fulfilled from missing APIs, to tooling support to round the development process to financial aspects such as pricing and engagement models to improve business value.

In embodiments of the invention, these relationships are captured in a graph structure that is flexible enough to capture known relationships, and also those that have yet to be envisioned, all front-ended with a set of APIs that easily integrate with tools enabled by ecosystem providers. This graph structure or data structure is called the API graph herein.

One embodiment of the invention is directed to a method for capturing information for a data structure, wherein the information selectively pertains to Web APIs and users of Web APIs. The method includes the step of identifying a first set of relationships, wherein an identified relationship can be at least a relationship between a Web API and a Web API user, a relationship between different Web API users, or a relationship between different Web APIs. The method further includes furnishing the first set of relationships to the data structure as first captured information, and using the first captured information to perform a specified analysis operation. Prior to or during performance of the specified analysis operation, second information is added to the data structure wherein the added second information includes at least one of a user, a Web API, or a relationship that is not included in the first captured information, and the added second information does not affect performance of the specified analysis operation.

BRIEF DESCRIPTION OF THE SEVERAL VIEWS OF THE DRAWINGS

FIG. 3 is a table depicting exemplary analysis operations based on the API graph of FIG. 1.

FIG. 7 is a block diagram showing a computer or data processing system that may be used in implementing embodiments of the invention.

DETAILED DESCRIPTION

Figure 1:
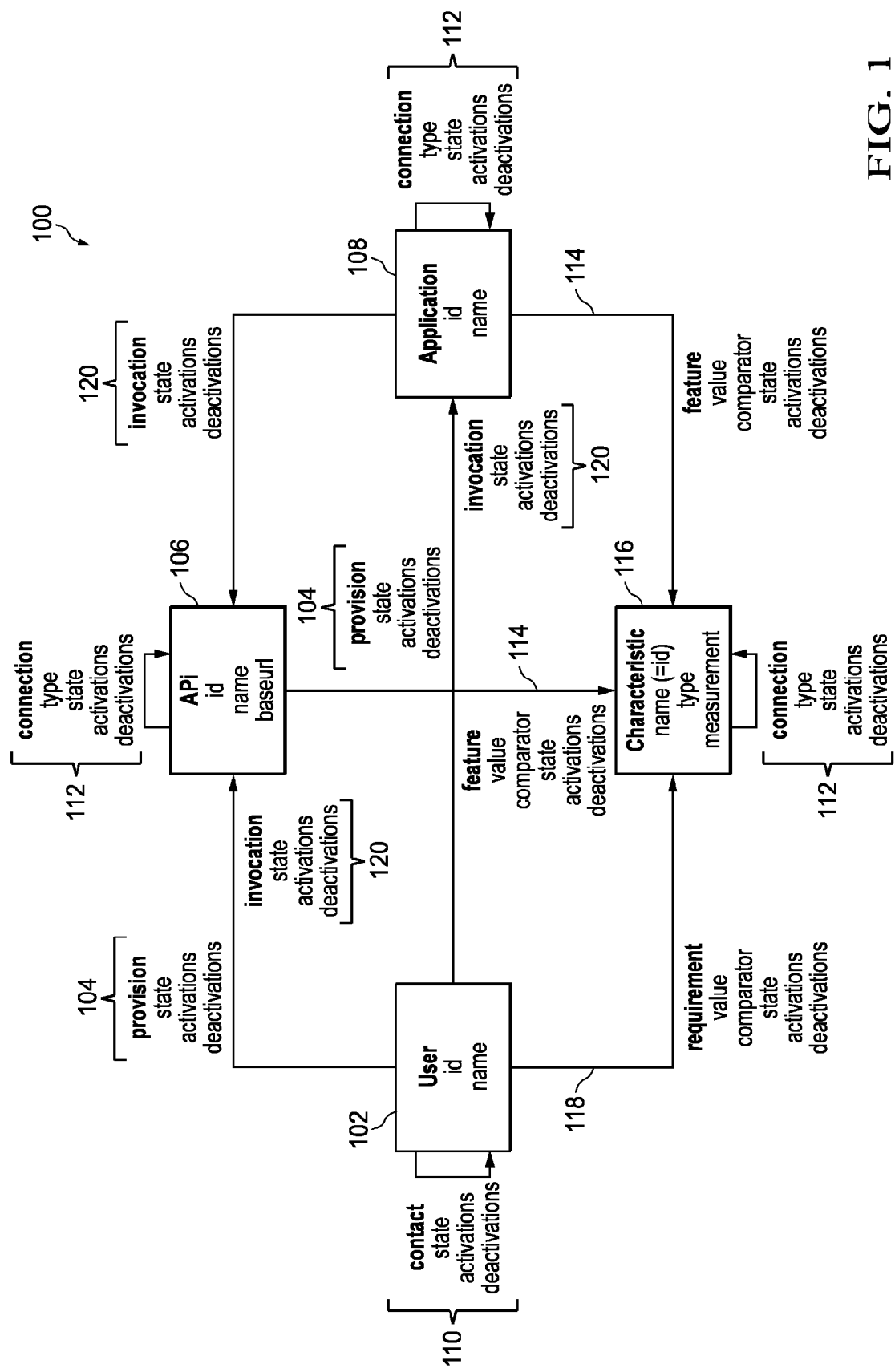
FIG. 1 is a block diagram showing a core structure of an API graph for use with an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention present an extensible, graph-based data model to capture the entities in an API ecosystem and their relations. They include temporal information in the data model to capture the evolution of API ecosystems. They also present means for continuously collecting required data in an API ecosystem, and presenting analysis operations for consumers, providers and the ecosystem provider to address the introduced challenges. Embodiments further present an implemented system based on the conceptualized data model. The system is used to collect actual data from an API ecosystem in the context of a hackathon event. Claims are evaluated using, on the one hand, the realistic data collected, and on the other hand, data about a particular web site which is commonly used in related work.

Referring to FIG. 1, there is shown a core structure 100 of an API graph, for use in association with an embodiment of the invention. Hereinafter, a number of novel aspects pertaining to the API graph are disclosed. These include the graph structure, and how each of the three roles described above benefits from use of the graph.

The graph data structure and semantics, described further in connection with FIG. 1, allows the main API features and usage relationships to be captured, while at the same time allowing for future extensibility when other relationships become apparent. APIs are expected to evolve through time, and as such the activation of features and relationships when they take place, and the deactivation when no longer relevant, are respectively tracked.

The analysis operations that are possible by each participant in the ecosystem can be explicit as a result of a given activity, or can be implicit, derived from examining nodes in the graph and their corresponding relationships. This approach and some examples are described hereinafter.

Figure 4:
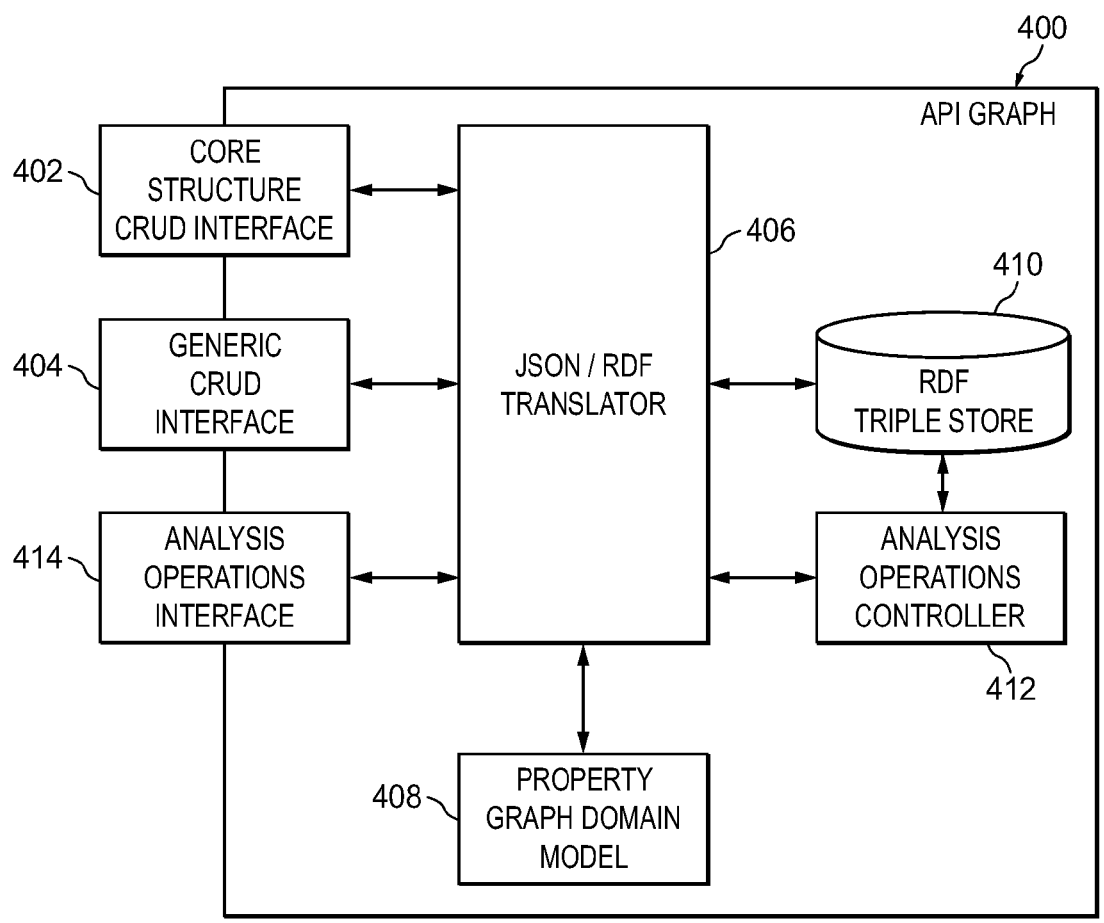
FIG. 4 is a block diagram showing components of the architecture for a system implementing the API graph of FIG. 1.

In the spirit of the API economy, the API graph is built as a service, with its own set of APIs. FIG. 4 is related to different graph resources. Using data from an internal Hackathon and from Programmable Web, a number of analytics opportunities and the results obtained are discussed.

The API graph's core structure is defined as a property graph, in which both nodes and edges (representing relationships between nodes) have properties specified as key-value pairs. The API graph further attempts a balancing act: it aims to allow performing a set of meaningful analysis operations, while not dictating a verbose and potentially off-putting structure. To achieve this balance, the embodiment of FIG. 1 initially captures fundamental concepts of an API ecosystem, and explicitly allows the data model to evolve over time, FIG. 1 illustrates the nodes and relationships denoting the API graph core structure 100.

User nodes 102 represent humans or organizations that interact with the API ecosystem. They denote provision relationships 104 or invocation relationships 120 to nodes representing API nodes 106, or application nodes 108. Depending on the existence of these relationships, users act either as providers, consumers, or both. Between user nodes 102, contact relationships 110 capture social structures, for example, that users are friends or follow each other. Application nodes 108, representing for example mash-ups (applications) in Programmable Web, also invoke API Nodes 106. Both API and application nodes can have connection relationships 112 to denote, for example, dependencies to other APIs or applications. API and application nodes may also have feature relationships 114 to characteristic nodes 116. Characteristic nodes 116 represent functionalities or non-functionalities that are potentially shared among APIs or applications. For example, characteristic nodes 116 represent categories like "social" or "location-based", data formats like JavaScript Object Notation (JSON) or Extensible Markup Language (XML), or qualities like "cost per request" or "availability". The concrete value that an API 106 or application 108 has with regard to a characteristic 116 is denoted in the properties of the feature relationship 114. For example, an API's feature relationship 114 to the characteristic "cost per request" with "measurement: $"_can denote the properties "value: 0.05" and "comparator: equals". User nodes 102 can have requirement relationships 118 to characteristic nodes 116 that (similar to feature relationships 114) capture quantitative information about the requirement.

The here presented core structure, while avoiding to be overly complex, already provides a rich set of relationships. This becomes clear when mapping web data exemplified by Programmable Web data as it is reported to the graph structure. Based on the data, nodes 106 for APIs and nodes 108 for mash-ups (applications), and the user nodes 102 who created them, can respectively be provided. Invocation relationships 120 between mash-ups and APIs, and provision relationships 104 between users and APIs/mash-ups can also be derived. Further, categories contained in the Programmable Web data can be represented as characteristic nodes 116 with feature relationships 114 from the corresponding APIs/mash-ups to them. Thus, the complete Programmable Web data is mappable to the API graph 100, whose core dataset constitutes a superset. Additionally, API graph 100 further allows capturing quantitative information about characteristics (using properties in feature relationships 114 and requirement relationships 118) and keeps track of the invocations 120 a user performs for each API and application.

As is known by those of skill in the art, mash-ups, of the type described above, are web applications which combine the use of multiple APIs that are each of a very specific type. More particularly, the specific type of API, that is an API for mashups, is known by those of skill in the art as a Web API. Web API calls refer to world-wide-web protocol based programmatic calls between programs. As an example, a server-side Web API is a programmatic interface to a defined request-response message system, typically expressed in JSON or XML, which is exposed via the web.

In view of the above, throughout the present patent application, including drawings, all uses of the terms "API" and "application programming interface" are to be interpreted as referring to, or to mean, "Web API" and "Web application programming interface", respectively.

Capturing the required data from an API ecosystem is enabled through the system of the API graph, which denotes required interfaces to collect data. This is described hereinafter in further detail. Concrete examples about how the required data can be obtained from an API ecosystem are further described hereinafter.

API ecosystems are subject to constant change and correspondingly evolve over time. For example, users, APIs, and applications enter and leave the ecosystem, their usage is volatile and their characteristics change. If the API graph 100 is capable of keeping track of these changes, its analysis operations bear the potential to better deal with the change. Providers can detect and react to changing demand or competition, consumers can obtain information about novel APIs to consume, and ecosystem providers can gain insights into how the ecosystem evolves over time.

To collect temporal information, all relationships in the API graph 100 denote a state property and capture time stamps of events in activation and inactivation properties, as illustrated in FIG. 1. More particularly, FIG. 1 explicitly shows that each of the relationships 104, 110-114 and 118-120 has a state property, an activation property and a deactivation property. On creation, a relationship obtains a first activation property, representing the creation date. Subsequent re-establishments of that relationship produce additional activation properties, thus capturing the relationship's currentness and relevance. For example, an invocation relationship 120 keeps track of the evolution of when and to what extent a user node 102 consumes an API node 106. With the creation and each re-establishment, the relationship's state property will be set to active. On the other hand, deletion of a relationship will not result in its data to be dismissed. Rather, a deactivation property will capture the time of the deletion and the relationship's state property will be set to inactive. This way, knowledge about the prior existence of a relationship is not lost due to data dismissal. Further, a history, for example about frequent changes of a relationship's state, can reveal patterns of interest. Using this mechanism, relationships could also be marked inactive automatically if they are not established for a certain period of time. One potential concern is the accumulation of data, which could eventually negatively impact performance. To avoid this, ancient data could be summarized, stating for example the amount of re-establishments in a certain time period within one property. Here, a trade-off between amount of data and its granularity must be chosen by the user.

It will be seen that by capturing the above temporal information, a database of such information is made available, for tracking usage of related ecosystem components. For example, the information could be used to determine whether a given API is being consumed more frequently or less frequently, by respective users. More generally, the temporal information could enable users to gain significant insights into evaluation of the ecosystem. Such insights, by way of example, could be directed to how the consumption of an API evolved, when an API did and did not denote corrections, and how requirements change over time.

As a further example of temporal information, FIG. 1 shows user node 102 having an invocation relationship 120 with API node 106. Activation and deactivation of the relationship 120 could be as follows, by way of example:

| Invocation |
|---|
| activation: 2013/01/04 |
| activation: 2013/04/13 |
| activation: 2013/08/01 |
| activation: 2013/08/02 |
| activation: 2013/08/03 |
| activation: 2013/08/04 |
| ... |
| deactivation: 2013/08/18 |

The example shows that invocations became frequent in August, 2013. Explicit deactivation of relationships 120 then occurred, possibly because API node 106 was substituted with another API.

The API graph's data should not reside in a silo, but rather embrace the openness of the Web whose APIs it attempts to describe. For this purpose, the data is represented in the API graph using the resource description framework (RDF). Utilizing RDF enables the API graph's dataset to be integrated with others, following the idea of open linked data. For example, RDF datasets capturing social relations between users or technical properties of APIs that can be integrated with the API graph. Similarly, the RDF data representing the API graph can thus be reused in other contexts as well. In RDF, information is stored in triples consisting of a resource, a predicate, and an object. Objects can either be other resources, allowing triples to depict relationships between them, or literals, allowing triples to depict properties of resources. The relationships defined in the API graph's core structure have properties. In RDF, however, predicates cannot in a standard way act as resources of triples, and thus cannot have their own properties. To overcome this problem, embodiments of the invention map the property graph representation of the API graph's core structure to RDF as illustrated in FIG. 2.

To represent nodes from the API graph in RDF, a resource representing the API graph node is defined. For each property of the node, a triple originating from that resource is defined whose predicate represents the key of the property and whose literal represents the value of the property. For each relationship of the property graph representation, another resource is defined. Again, to represent properties of the relationship, triples whose objects are literals and that originate from this resource are defined. Thus, as least two triples are required to represent a relationship between two nodes in the property graph, one originating from the source and targeting the relationship, and one originating from the relationship, and targeting the target node. The naming conventions has <relationship name>, respectively <relationship name> of are used for the predicates of these two triples (see FIG. 2.) While this mapping results in an increased number of triples, it allows relationships, represented as resources, to be the origin of as many further descriptive triples as needed.

Figure 2:
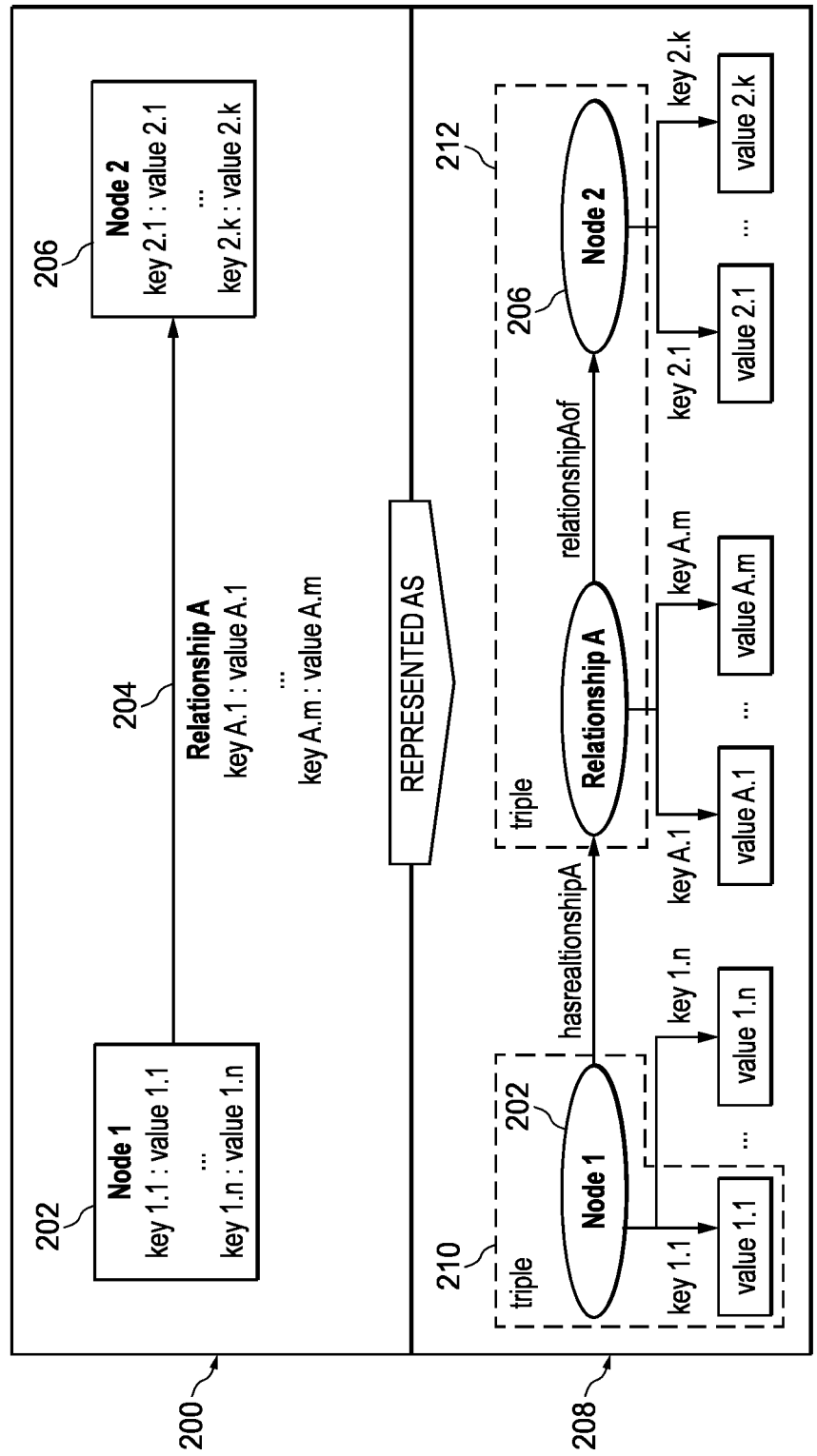
FIG. 2 is a schematic diagram for illustrating a mapping or translating of property data from the API graph of FIG. 1 to a resource description framework (RDF) representation.

FIG. 2 illustrates the process described above, of representing property information of the nodes and relationships of an API property graph 200, in an RDF property graph 208. As described above, each node and each relationship of the API graph has one or more properties, wherein each property is specified as a key-value pair. As a simplified example, node element 202 is connected to node 206 by relationship 204. Node 202, node 206 and relationship 204 of FIG. 2 could comprise user 102, API 106 and invocation relationship 120 of FIG. 1, respectively, by way of example. However, embodiments of the invention are by no means limited thereto.

FIG. 2 further shows that node 202 comprises a node 1, which has key value pairs key 1.2-value 1.1 through key 1.n-value 1.n. Similarly, relationship 204 comprises a relationship A that has key value pairs key A.1-value A.1 through key A.m-value A.m. Node 206 comprises a node 2 that has key value pairs key 2.1-value 2.1 through key 2.k-value 2.k. As is known by those of a skill in the art, a key may be the name of a property attribute of the corresponding node or relationship, and a value is the specific value of that property.

In order to represent a property of a node from API graph 200, a triple as described above must be formed for the RDF property graph 208. This is carried out by using the resource comprising the node as the subject for the triple. The predicate is the key, that is, the name of the property, and the object is the value of that key, or property name. FIG. 2 illustrates a triple 210 of this type. Two of the three elements of triple 210 are the property key 1.1, and the value 1.1 for that key. The third element is node 1, which has a relationship A.

To represent a property of a relationship in RDF graph 208, the relationship becomes a resource. This is shown by triple 212 of FIG. 2, which includes relationship A as a node, the relationship A targeted to node 2, and node 2 as the target node.

An example of a key-value pair for an embodiment of the invention, also known as an attribute-value pair, could be the following:

[apig:user 1000, apig:type, apig:Node]

The key or attribute of this key-value pair would be the "type" of user_100 in an API graph. The value would be "node".

Another example of a key-value pair would be the following:

[apig:api_62/feature/availability, apig:creationdate,
"2013-08-16T09:50:33.615-04:00"
^^http://www.w3org/2001/XMLSchema#dateTime]".

The key for this key-value pair would be the creation date and time of availability for API-62 of the API graph. The value would be "2013-08-16T13:55:35.133-04:00".

API ecosystems undergo constant change. Providers, consumers and APIs enter and leave the ecosystem. New technologies arise or shift in importance. Eventually, new consumption models (e.g., requests in exchange for another) or new actors (e.g., intermediaries or brokers) enter the ecosystem. To cope with the resulting dynamics, the API graph's data model supports extensibility in three ways.

The core structure's generic nodes and edges can be instantiated as needed. For example, nodes of type "characteristic" can denote functionalities, non-functionalities, or business-related concerns.

Novel properties of nodes and edges can instantiated. The API graph's core structure denotes a selection of properties considered relevant currently. In the future, new properties can be instantiated depending on changing needs. Here, the additive nature of graphs is advantageous because it allows adding nodes, edges, or sub graphs without interfering with existing queries. For example, novel semantic API descriptions might require capturing their resource's URL as a property of API nodes.

Arbitrary nodes and edges can be added. If needed, novel nodes or edges can be added to the API graph. Their translation to RDF follows the pattern described above. Again, the additive nature of graphs prevents them from interfering with or breaking existing queries. The addition of arbitrary nodes and relationships is supported by a generic REST interface, as described hereinafter in connection with FIG. 4. For example, a new role like a broker can be represented with a novel type of node and having novel relationships from consumers (e.g., commission) and to APIs (e.g., recommend).

While the presented mechanisms enable a high degree of extensibility, the resulting trade off regarding query support needs to be considered. While not interfering with existing queries, additions to the API graph outside of the core schema require queries incorporating them to be defined. It is considered that significant new utilizations of the API graph will evolve over time, thus triggering the creation of appropriate queries.

An API graph enables two types of insights: direct and indirect. Direct, or explicit, insights refer to use-case driven analysis. For each of the API graph users: API provider, API consumer and ecosystem provider, the typical insights and how API graph structure lends to their requirements are described herein. For example, API providers may be interested in a breakdown of capabilities supported by competing services. By indirect, or implicit, insights we refer to insights obtained by querying the API graph, which can be fed back to enrich it. For example, by querying the API graph and user properties, a graph user may be able to create a new relationship between API nodes based on the user characteristics (e.g. users come from a specific region).

The goal of use-case driven ecosystem insights is to assist the three roles of provider, consumer, and ecosystem provider in their interactions with the API ecosystem, using the information stored in the API graph.

Using the proposed structure of the API graph as described above, one can obtain critical insights about API ecosystems and consumption patterns of the APIs and applications by executing queries over the graph entities and relationships. The API graph enables insights that are valuable to three key user groups: API consumer, API (App) provider, and the ecosystem provider. Given the potentially high denseness of the API graph, various analysis operations are possible based on the nature of the captured information.

The API graph can produce insights that are of interest to API providers, consumers, and the ecosystem to drive the API and application (App) consumption. Through search queries or discussions in forums on the API ecosystem, consumers expose their requirements. Such information can be used to identify whether existing APIs/App are in place to enable such characteristics. Similarly, API providers and the ecosystem can use this information to understand if there are APIs/Apps with low usage that can be enhanced to incorporate sought after requirements. Insights about what different APIs and Apps are enabling help providers obtain insights into the competition and how they can differentiate their offering.

The table of FIG. 3 shows how the API graph can enable these insights. For each sample use case, the table shows the path of query on an API graph, to realize the required insight and provide the resulting set of nodes representing the insight. For example, if consumers want to know which APIs their business and social contacts are using, the graph would traverse the user's contact relationships to other users and from them, invoke their relationships to APIs. The insight is represented by the thus identified set of APIs. More complex insights, such as the ability to understand which characteristics users seek, could be provided by low usage APIs/Applications, and require a number of queries about the user, characteristics and API consumption levels. Such insights are key to understanding how to improve and what characteristics can drive higher consumption of APIs (or applications).

Referring to FIG. 3, there is shown a table pertaining to exemplary use cases 302-312. Each use case is associated with one of the types of API graph users described above, and is concerned with a particular query. By using the API graph to execute respective queries, valuable insights may be realized in regard to API ecosystems and consumption patterns of APIs and applications.

Use case 302 pertains to API Consumer$_i$, and the query "Which APIs are my contacts using?" To gain insight by answering this query, Consumer$_i$ can use contact information, for the Consumer$_i$ node of the API graph to identify each contact $U_i$ of Consumer$_i$. These contacts collectively are contacts $U_{i\ldots n}$. Consumer$_i$ then uses data from the API graph to determine that contacts $U_{i\ldots n}$ collectively invoke API$_{1\ldots m}$, which is the desired result.

Use case 304 pertains to API Consumer$_i$ and to the query "Which APIs meet my requirements?" For this query, Consumer$_i$ uses API graph data to determine that its users $U_i$ collectively have the requirements $C_{1\ldots n}$. Analysis of API graph data then shows that requirements $C_{1\ldots n}$ can be met by providing respective features of API$_{1\ldots m}$.

Use case 306 pertains to API Provider$_j$ and to the query "Which characteristics are required that I currently do not offer?" API graph data is used to determine that users $U_j$ of Provider$_j$ already have APIs and applications API/App$_{1\ldots n}$ which offer features or characteristics $C_{1\ldots m}$. Other users $U_{1\ldots k}$ require characteristics $C_{1\ldots l}$. The query of use case 306 can then be resolved by comparing characteristics $C_{1\ldots l}$ and $C_{1\ldots m}$.

Use case 308 pertains to API Provider$_j$ and to the query "Who provides APIs/Apps with similar characteristics?" To answer this query, API graph data is used to determine that Provider$_j$ already provides its users $U_j$ with APIs and applications that have the characteristics $C_{1\ldots m}$. The API graph data is used further to determine that the characteristics $C_{1\ldots m}$ are also provided by APIs and applications API/App$_{1\ldots k}$. These are made available by users $U_{1\ldots l}$, which is the result of the query.

Use case 310 pertains to an Ecosystem Provider, and to the query "Which characteristics are common to successful APIs/Apps?" This query uses API graph data to determine that each of the APIs and applications API/App$_{1\ldots n}$ has a number of user invocation events that exceeds a pre-specified minimum x. The API graph further indicates that each of the API/App$_{1\ldots n}$ has all of the characteristics $C_{1\ldots m}$.

Use case 312 pertains to an Ecosystem Provider, and to the query "Which often required characteristics are not provided by unsuccessful APIs?" This query first uses API graph data to identify a set of required characteristics $C_{1\ldots n}$. This is accomplished by analyzing data to determine characteristics that are each required by more than a pre-specified number x of users. The query then identifies a set API/App$_{1\ldots m}$ that each has less than a pre-specified number y of invocation events. The set API/App$_{1\ldots m}$ provides characteristic $C_{1\ldots k}$. The characteristic sets and $C_{1\ldots k}$ are then compared with each other, to furnish a result for the query of use case 312.

Implicit, or indirect, insights are an auxiliary outcome of the API graph. These analysis operations are designed to derive insights from the API graph that can be used to enrich the API graph. For example, API nodes can share a set of characteristics. This information can first be obtained from querying the API graph and then be put back into it, for example, by creating a connection relationship between the API nodes. Such insights are categorized as follows:

Ability to detect previously unknown/novel behavior by analyzing recorded changes and adding to the pattern sets Correlation among activities during API usage can be analyzed Use understanding to define new properties, new patterns Other methods to detect behavior on stored changes: causality detection Significance based ecosystem behavior detection Ability to control what changes be responded to/allowed by defining patterns Ability to control what changes are disallowed Using patterns/anti-patterns to record graph evolution Patterns can be annotated with provenance information (how created, when, replacing which ones, why created)

Additional insights may be derived by combining API graph data with other RDF graphs. For example, log data gathered from applications that are using APIs can be analyzed and used to compute API usage and QoS statistics that are represented as a new RDF graph. That graph can be used to annotate nodes in API graph with information that will help API consumers to compare and select APIs based on consumer side characteristics.

Referring to FIG. 4, there are shown components for the architecture of a system implementing API graph 400 according to concepts described above.

The API graph is implemented as a service, denoting Representational State Transfer (REST) interfaces. On the one hand, core structure CRUD interface 402 exposes the entities of the API graph's core structure described above in connection with FIG. 1. For each node (e.g., user or API), create, read, update, and delete (CRUD) operations are provided at a designated endpoint (e.g., . . . /user). Additionally, these endpoints provide CRUD operations for the relationships defined in the API graph's core structure that originate from these nodes. For example, creation or retrieval of an invocation relationship between user "A" and API "B" can be achieved by performing POST respectively GET to . . . /user/A/invocation/B. On the other hand, the generic CRUD interface 404 provides CRUD operations for any type of nodes and relationships. This interface allows the API graph to be extended beyond its core structure, by enabling relationships and nodes of any, novel kind to be defined, as described above.

The two types of CRUD interfaces allow the API graph to be integrated with API ecosystems. In reaction to events in the ecosystem, corresponding actions can be triggered in the API graph using them. For example, if a new user or API registers, a user or API node in the API graph can be posted. Or, if a user invokes an API, an invocation relationship between the two can be posted. Thus, a continuous data collection results where events in the ecosystem are reflected in the API graph. Concrete examples of such integration are provided hereinafter.

The REST interfaces consume and produce data in Java Script Object Notation (JSON) format, which is useful for transmitting data objects comprising attribute-value pairs. A resource representing a node contains it's type, (e.g., "user"), id (e.g., "user_93"), href in the API graph (e.g., ". . . /user/user_93"), and lists of properties (e.g., "name=Erik Wittern"), incoming relationships (e.g., "user_7/contact/user_93") and outgoing relationships (e.g., "user_93/invocation/api_20"). Similarly, a resource representing a relationship contains its type (e.g., "invocation"), id (e.g., "user_93/invocation/api_20"), href in the API graph (e.g., ". . . /user/user_93/invocation/api_20"), source and source href, target and target href, and a list of properties. JSON/RDF translator 406 is responsible for translating between this representation of data and RDF, which is used to persist data. To do so, received JSON is decoded by the translator to intermediary property graph domain model 408.

In the implementation, this domain model uses plain old Java objects (POJOs). The POJOs are then translated to RDF triples, which are persisted in RDF triple store 410. Reversely, when requesting data from the API graph, required triples are retrieved from the RDF triple store using SPARQL queries. JSON/RDF translator 406 populates corresponding POJOs out of the triples, which are encoded in JSON and provided at the REST interfaces.

To access the API graph's analysis operations, a dedicated analysis operations interface 414 exists. It provides dedicated endpoints per analysis operation, allowing for example, to retrieve a list of APIs that fulfill (some of) a user's requirements for characteristics by issuing a GET to . . . /analysis/requirementsmatching/<userid>. Analysis operations themselves are performed by analysis operations controller component 412, which issues required SPARQL queries to RDF triple store 410. Resulting data is translated to JSON by the translator component and provided via REST interface.

Evaluation of the API graph builds upon three instruments: first, the implemented system was utilized to collect data from an actual API ecosystem, thus evaluating the above claims for continuous data collection. Second, the collected data was used to perform a set of analysis operations, thus evaluating the functionality of these operations and showing their applicability to real-life data. Third, a well-known dataset from related work was utilized to perform another set of analysis operations, evaluating the expressiveness and applicability of our approach in contrast to related approaches.

Continuous data collection with the API graph was evaluated by integrating it with an API ecosystem developed by a major provider. The API ecosystem consists of a catalog that allows providers to list APIs. Consumers can browse listed APIs and obtain information about the APIs endpoints, request and response data structures, Terms of Service, etc. Data was collected by integrating the API graph in the following way:

When a user signed up to the ecosystem, a corresponding node is posted to the API graph.

When an API is registered to the ecosystem, a corresponding node is posted to the API graph. A provision relationship between the API node and the node representing the user is also created. Each endpoint of the API is also represented with a corresponding API node. A connection relationship of type "parent API" between the nodes representing the endpoint and the API is created.

A widget for each API allows users to provide tags for APIs. Tags can either be keywords (e.g., "social" or "location-based") or quantitative expressions (e.g., "requestcosts=0.05" or "availability>99.5"). When a user creates a tag, a corresponding characteristics node is created if it does not exist yet. A feature relationship between the API and the characteristics node is created. In the case of quantitative expressions, the feature relationship contains a comparator ("=", "<", or ">") and a value property.

A widget for each user allows them to specify requirements for APIs using tags. Again, tags can either be keywords or quantitative expressions. When a user creates a tag, a corresponding characteristics node is created if it does not exist yet. A requirement relationship between the user and the characteristics node is created, including again comparator and value properties in the case of quantitative expressions.

The catalog provides the functionality to test invoke API endpoints from the GRAPHICAL USER INTERFACE to allow potential consumers to obtain hands-on information about required parameters and data structures.

When a user uses this functionality, an invocation relationship between the user and the endpoint node is created.

Using this integration, the API graph data set grew while users were interacting with the API ecosystem. We were able to collect the data described in the table set forth below:

| Data element | Collected entries |
| --- | --- |
| User nodes | x |
| API nodes | x |
| Characteristics nodes | x |
| Provision relationships | x |
| Connection relationships | x |
| Feature relationships | x |
| Requirement relationships | x |
| Invocation relationships | x |

Based on the collected data, N analysis operations were evaluated. First, we performed API recommendation based on stated preferences. The operation returns, for a given user, the set of APIs that matches requirements stated by the user, represented using requirement relationships to required characteristics. The analysis operation considers quantitative expressions. For example, if a user has a requirement "availability>99.5", only APIs whose availability is denoted to be within this range are returned. This analysis operation is used by the requirements widget outlined above. So that after putting in a requirement, users will immediately be presented with the resulting set of APIs.

Figure 5:
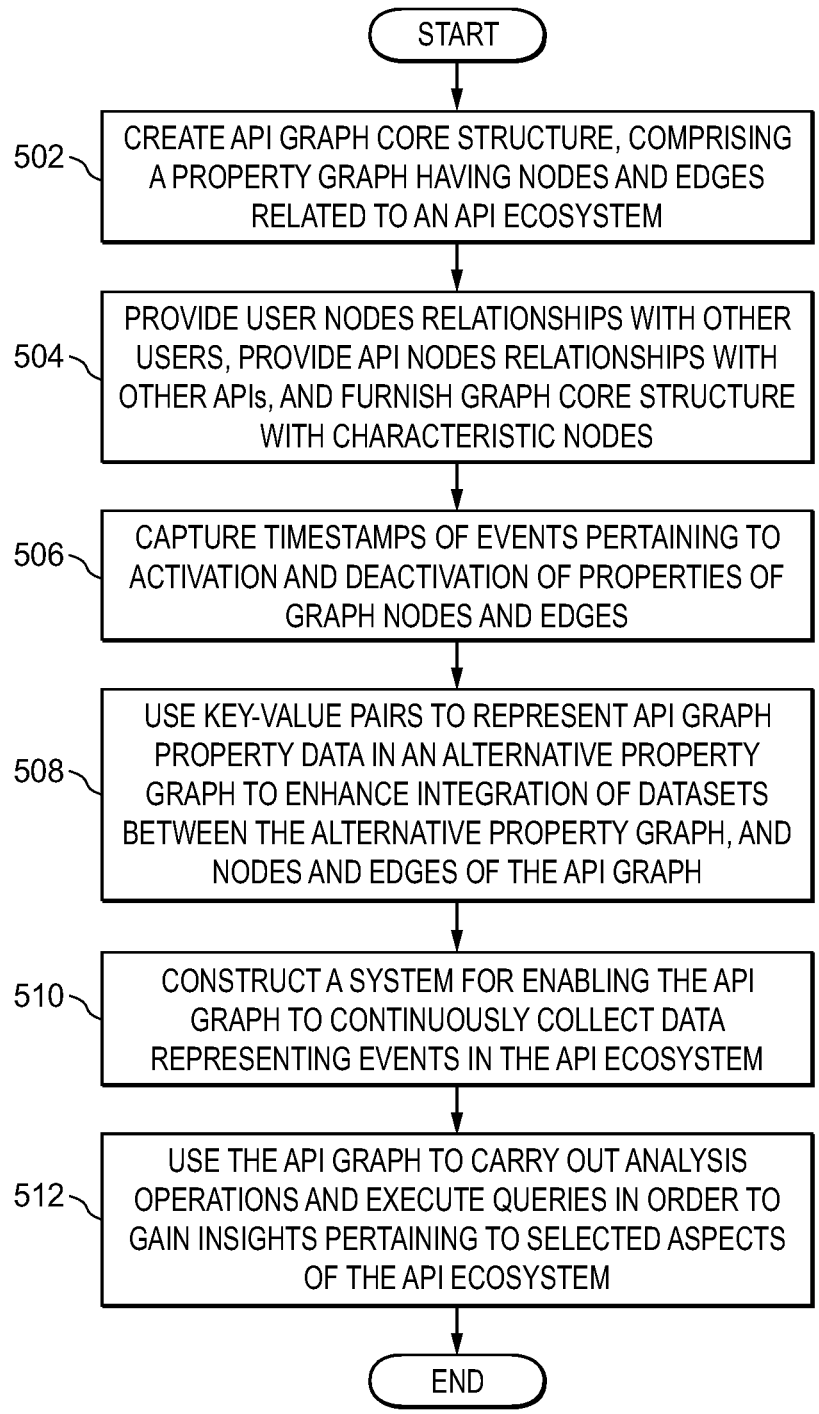
FIG. 5 is a flowchart showing steps of a method for an embodiment of the invention.

Referring to FIG. 5, there are shown steps of a method for an embodiment of the invention. At step 502 an API graph core structure is created, which comprises a property graph, and has nodes and edges related to an API ecosystem. At step 504 user nodes are provided with contact relationships, comprising social relations or the like with other users. API nodes are provided connection relationships with other APIs or applications.

Step 506 captures timestamps of events that pertain to activations and deactivations of respective properties of graph nodes and edges. At step 508, key-value pairs are used to represent API graph property data in an alternative property graph, such as an RDF graph. This enhances integration of datasets between the alternative property graph and nodes and edges of the API graph. For example, as described above, RDF datasets capturing social relations between users or technical properties of APIs can be integrated with the API graph. Similarly, RDF data representing the API graph can be used in other contexts as well.

At step 510, a system is constructed for enabling the API graph to continuously collect data representing events in the API ecosystem. The system may use REST interfaces to implement this step.

At step 512, the API graph is used to carry out analysis operations and to execute queries, in order to gain insights pertaining to selected aspects of the API ecosystem. Exemplary queries are discussed above in connection with FIG. 3.

Embodiments of the invention provide a system to support the storage and analysis of entities of an API ecosystem. Such a system can be useful to API providers, consumers, and the ecosystem providers. The system includes the API graph which is built on an RDF data store, and is designed to be extensible in order to store arbitrary entities and relationships among these entities. The core entities of the API graph are the APIs themselves, users, applications that compose the APIs, and characteristics, as well as relationships among these entities, and properties on the entities and relationships. Relationships include the users that provision an API, the characteristics offered by an API, and the user invocations of an application. Furthermore, the API graph records when these entities and relationships were created, and possibly deleted.

While the API graph is extensible, the above core structure was designed to support a comprehensive set of analysis operations that we've enumerated that would be of interest to API consumers, providers, and ecosystem providers. The analysis operations include those that are directly captured by the entities, such as the APIs used by the contacts of users. Also, insights gathered by additional analysis, such as finding clusters of users with similar API invocation patterns, can be stored in the API graph.

A REST interface to the API graph offers a familiar interface to API consumers, providers, and ecosystem providers. The interface fully supports any extensions to the core structure, but offers defined endpoints for the core entities, relationships, and analysis operations. We evaluated the API graph by applying to a number of real use cases and data sets. This includes the ability to model the data in an API catalog developed at a major provider, and the ability to perform a set of analysis operations on this data. Also, we show that the API graph is expressive and extensible enough to store and analyze the information in the ProgrammableWeb database.

Figure 6:
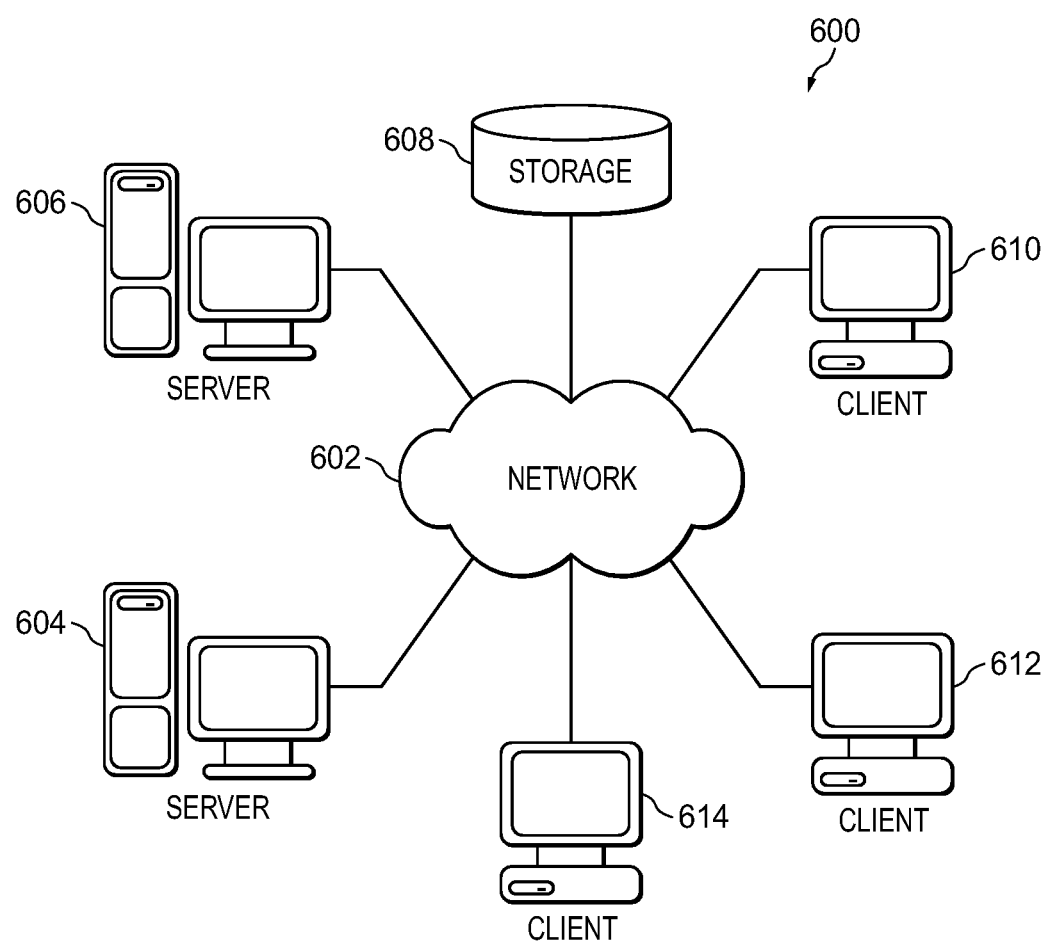
FIG. 6 is a block diagram showing a network of data processing systems in which an embodiment of the invention may be implemented.

FIG. 6 is a pictorial representation of a network of data processing systems in which illustrative embodiments of the invention may be implemented. Network data processing system 600 is a network of computers in which the illustrative embodiments may be implemented. Network data processing system 600 contains network 602, which is the medium used to provide communications links between various devices and computers connected together within network data processing system 600. Network 602 may include connections, such as wire, wireless communication links, or fiber optic cables.

In the depicted example, server computer 604 and server computer 606 connect to network 602 along with storage unit 608. In addition, client computers 610, 612, and 614 connect to network 602. Client computers 610, 612, and 614 may be, for example, personal computers or network computers. In the depicted example, server computer 604 provides information, such as boot files, operating system images, and applications to client computers 610, 612, and 614. Client computers 610, 612, and 614 are clients to server computer 604 in this example. Network data processing system 600 may include additional server computers, client computers, and other devices not shown.

Program code located in network data processing system 600 may be stored on a computer-recordable storage medium and downloaded to a data processing system or other device for use. For example, program code may be stored on a computer-recordable storage medium on server computer 604 and downloaded to client computer 610 over network 602 for use on client computer 610.

In the depicted example, network data processing system 600 is the Internet with network 602 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 600 also may be implemented as a number of different types of networks, such as, for example, an intranet, a local area network (LAN), or a wide area network (WAN). FIG. 6 is intended as an example, and not as an architectural limitation for the different illustrative embodiments.

Turning now to FIG. 7, an illustration of a data processing system is depicted in accordance with an illustrative embodiment. In this illustrative example, data processing system 700 includes communications fabric 702, which provides communications between processor unit 704, memory 706, persistent storage 708, communications unit 710, input/output (I/O) unit 712, and display 714.

Processor unit 704 serves to process instructions for software that may be loaded into memory 706. Processor unit 704 may be a number of processors, a multi-processor core, or some other type of processor, depending on the particular implementation. "A number," as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for processing by processor unit 704. The processes of the different embodiments may be performed by processor unit 704 using computer-implemented instructions, which may be located in a memory, such as memory 706.

These instructions are referred to as program code, computer usable program code, or computer readable program code that may be read and processed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for processing by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700.

In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, a remote data processing system, or some other device capable of storing and transmitting program code 718. For example, program code stored in the computer readable storage medium in data processing system 700 may be downloaded over a network from the remote data processing system to the computer readable storage medium in data processing system 700. Additionally, program code stored in the computer readable storage medium in the server computer may be downloaded over the network from the server computer to a computer readable storage medium in the remote data processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for capturing information for a data structure, wherein the information selectively pertains to Web application programming interfaces (APIs) and to users of Web APIs, the method comprising:
    identifying a first set of relationships, wherein an identified relationship can be at least a relationship between a Web API and a Web API user, a relationship between different Web API users, or a relationship between different Web APIs;
    furnishing the first set of relationships to the data structure as first captured information, wherein the data structure comprises a Web API graph having nodes and edges, and wherein an edge comprises a relationship between two nodes, and wherein a dataset comprising properties of respective nodes and edges is selectively represented in a specified property graph that represents data in a different form than a form of data representation in the Web API graph;
    using the first captured information to perform a specified analysis operation; and
    prior to or during performance of the specified analysis operation, adding second information to the data structure, wherein the added second information includes at least one of a user, a Web API, or a relationship that is not included in the first captured information, and the added second information does not affect performance of the specified analysis operation.

2. The method of claim 1, wherein:
    the data structure comprises a Web API graph core structure having nodes and edges, wherein a given node selectively comprises a Web API, an application, or a Web API user and a given edge comprises a relationship provided by the first captured information or the second added information, selectively.

3. The method of claim 2, wherein:
    a new node or edge can be selectively added to the Web API graph, wherein an added node or graph includes added second information captured from a Web API ecosystem, and the Web API graph core structure includes at least one node or edge that can be selectively instantiated.

4. The method of claim 2, wherein:
    the Web API graph core structure has at least one node comprising a characteristic node, each characteristic node representing functionality or a non-functionality that is shared among multiple Web API nodes, selectively.

5. The method of claim 2, wherein:
    a Web API user node has a contact relationship with each of one or more other users, and a Web API node has a connection relationship with each of one or more other Web APIs.

6. The method of claim 2, wherein:
    respective nodes and edges have selected properties, and temporal information is captured for events that affect a given property.

7. The method of claim 1, wherein:
    the specified property graph comprises a resource description framework (RDF) graph, each property of respective nodes and edges of the Web API graph has a corresponding key-value pair, and the key-value pair of a given property is used to represent specified information pertaining to the given property in the RDF graph.

8. The method of claim 1, wherein:
    the data structure comprises the Web API graph, which is provided as a service, and is made accessible by a specified interface.

9. The method of claim 8, wherein:
    the specified interface comprises a representational state transfer (REST) interface.

10. The method of claim 1, wherein:
    the specified analysis operation comprises using specified information captured for the data structure to execute a specified query, in order to acquire an insight pertaining to an ecosystem related to the specified information captured for the data structure.

11. The method of claim 1, wherein:
    a user of Web APIs comprises one or more of a Web API provider, a Web API consumer, and a Web API ecosystem provider.

12. A computer program product for capturing information for a data structure, wherein the information selectively pertains to Web application programming interfaces (APIs) and to users of Web APIs, the computer program product comprising a non-transitory computer readable storage medium having program instructions embodied therewith, the program instructions executable by a computer to cause the computer to perform a method comprising:
    identifying a first set of relationships, wherein an identified relationship can be at least a relationship between a Web API and a Web API user, a relationship between different Web API users, or a relationship between different Web APIs;
    furnishing the first set of relationships to the data structure as first captured information, wherein the data structure comprises a Web API graph having nodes and edges, and wherein an edge comprises a relationship between two nodes, and wherein a dataset comprising properties of respective nodes and edges is selectively represented in a specified property graph that represents data in a different form than a form of data representation in the Web API graph;
    using the first captured information to perform a specified analysis operation; and adding second information to the data structure prior to or during performance of the specified analysis operation, wherein the added second information includes at least one of a user, a Web API, or a relationship that is not included in the first captured information, and the added second information does not affect performance of the specified analysis operation.

13. The computer program product of claim 12, wherein:
the data structure comprises a Web API graph core structure having nodes and edges, wherein a given node selectively comprises a Web API, an application, or a Web API user and a given edge comprises a relationship provided by the first captured information or the second added information, selectively.

14. The computer program product of claim 13, wherein:
a new node or edge can be selectively added to the Web API graph, wherein an added node or graph includes added second information captured from a Web API ecosystem, and the Web API graph core structure includes at least one node or edge that can be selectively instantiated.

15. The computer program product of claim 13, wherein:
the Web API graph core structure has at least one node comprising a characteristic node, each characteristic node representing a functionality or a non-functionality that is shared among multiple Web API nodes, selectively.

16. The computer program product of claim 13, wherein:
a Web API user node has a contact relationship with each of one or more other users, and a Web API node has a connection relationship with each of one or more other Web APIs.

17. The computer program product of claim 12, wherein:
the specified property graph comprises a resource description framework (RDF) graph, each property of respective nodes and edges of the Web API graph has a corresponding key-value pair, and the key-value pair of a given property is used to represent specified information pertaining to the given property in the RDF graph.

18. A computer system for capturing information for a data structure, wherein the information selectively pertains to Web application programming interfaces (APIs) and to users of Web APIs, the computer system comprising:
a bus;
a memory connected to the bus, wherein program code is stored on the memory; and
a processor unit connected to the bus, wherein the processor unit executes the program code:
to identify a first set of relationships, wherein an identified relationship can be at least a relationship between a Web API and a Web API user, a relationship between different Web API users, or a relationship between different Web APIs;
to furnish the first set of relationships to the data structure as first captured information wherein the data structure comprises a Web API graph having nodes and edges, and wherein an edge comprises a relationship between two nodes, and wherein a dataset comprising properties of respective nodes and edges is selectively represented in a specified property graph that represents data in a different form than a form of data representation in the Web API graph;
to use the first captured information to perform a specified analysis operation; and
prior to or during performance of the specified analysis operation, to add second information to the data structure, wherein the added second information includes at least one of a user, a Web API, or a relationship that is not included in the first captured information, and the added second information does not affect performance of the specified analysis operation.

* * * * *